Mar. 27, 1923. 1,449,458
L. A. SUTERMEISTER
APPARATUS FOR MANUFACTURE OF ICE CREAM
Filed Aug. 30, 1921
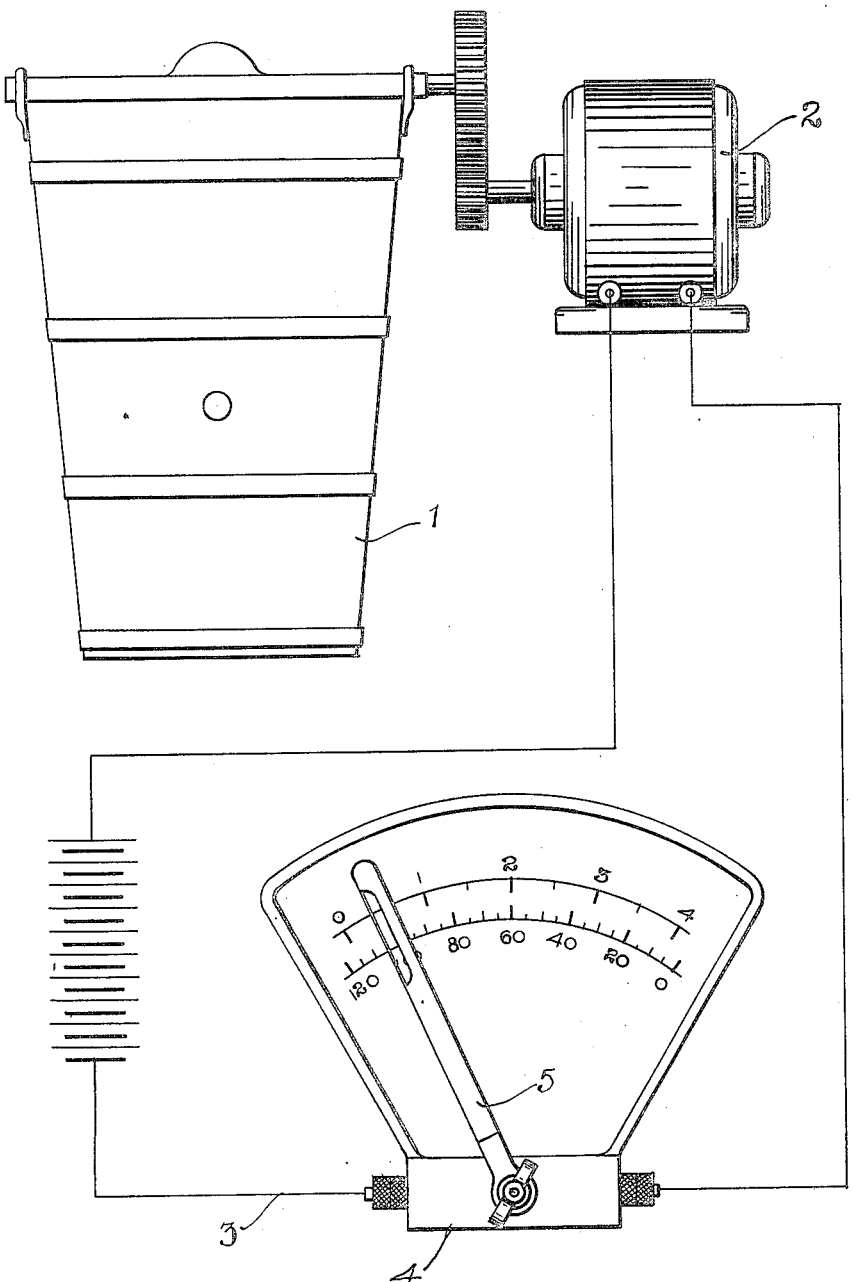
INVENTOR.
Lowell A. Sutermeister
BY
T. L. Walker
ATTORNEY.

Patented Mar. 27, 1923.

1,449,458

UNITED STATES PATENT OFFICE.

LOWELL A. SUTERMEISTER, OF DAYTON, OHIO.

APPARATUS FOR MANUFACTURE OF ICE CREAM.

Application filed August 30, 1921. Serial No. 496,905.

*To all whom it may concern:*

Be it known that I, LOWELL A. SUTER-MEISTER, a citizen of the United States, residing at Dayton, in the county of Montgomery and State of Ohio, have invented certain new and useful Improvements in Apparatus for Manufacture of Ice Cream, of which the following is a specification.

My invention relates to ice cream making and more particularly to the aeration or expansion of the ice cream mixture during the freezing process, and the accurate determination of the degree of expansion or "overrun."

In the manufacture of ice cream, a certain degree of aeration or expansion of the product is desirable to render it most palatable. In the commercial manufacture of ice cream it is the practice to agitate the cream during the initial period of the freezing operation, until the mixture has become fairly fixed or semi-fluid. When this predetermined state is reached, the brine used for freezing is shut off, or the freezing operation is otherwise arrested, and the agitator is continued in operation to incorporate into the partially frozen mixture a quantity of air by beating or whipping whereby the mixture becomes quite light or fluffy. This aeration inducing fluffiness effects an expansion of the original quantity of mixture. The degree of expansion or overrun thus induced varies with different manufacturers, and ranges from seventy-five per cent to one hundred per cent or more of the bulk of the original mixture. This expansion or overrun will also vary somewhat with different characters of mixture or batch. It is the aim, however, of commercial manufacturers of ice cream to maintain a uniform quality of product by effecting a predetermined or standardized amount of overrun or aeration. The usual method of determining this overrun is to initially weight a given quantity, for instance, one pint of the mixture or batch. Then from time to time during the process of aeration or whipping, an equal quantity of the mixture is drawn off and weighted and comparisons noted. As the aeration or overrun progresses, the measured quantity of aerated mixture will decrease in weight. That is to say, the expanded quantity of mixture will weigh less than the same quantity of original mixture or batch.

The difficulty of this procedure is that it depends more or less upon guess-work of the operator as to when the product has reached the desired degree of aeration or expansion and each sample drawn off for test involves a waste and loss to the manufacturer. It has been discovered that the power required to drive and agitate the mixture varies inversely as the expansion. The hereinafter described method enables the operator to produce the standardized or predetermined quantity of overrun or expansion of the ice cream without the necessity of taking repeated samples or interrupting the progress of the whipping or aerating operation.

The object of the invention is to simplify the means and method of determining the degree of overrun or expansion due to aeration of the ice cream batch with accuracy and without interrupting the operation or causing waste or losses of material or products.

A further object is to provide a method for progressively indicating the condition of the product, not only during the aerating process, but also during the initial freezing process in order that the freezing operation may be arrested at the proper stage as well as the subsequent whipping operation, or aeration arrested when the predetermined degree of overrun has been acquired.

With the above primary and other incidental objects in view as will more fully appear in the specification, the invention consists of the features of construction, the parts and combinations thereof and the mode of operation or their equivalents as hereinafter described and set forth in the claims.

The accompanying drawing is a diagrammatic view, illustrating a power driven ice cream freezer together with the power circuit and measuring instrument therein.

It has been discovered that the resistance of the batch or mixture to the agitator increases progressively during the initial freezing operation, requiring for the operation of the agitator a progressively increasing quantity of elliptic current to the motor, and that during the aeration or whipping operation by which the expansion is achieved, the resistance of the batch or mixture progressively decreases whereby the power required to drive the agitator or whipper is in inverse ratio to the degree of overrun or expansion. Thus by measuring the amount of current required to operate the driving motor, in comparison with the power required at the beginning of operation, the exact condition of the batch as to solidity or freezing during the initial operation, and the amount of overrun or expansion during the subsequent whipping operation may be accurately determined.

Referring to the drawing, 1 is an ice cream freezer, which may be of any suitable or approved construction. The freezer is operatively connected with an electric driving motor 2. Located in the motor circuit 3 is an ammeter or wattmeter 4, which may be of any desired construction, but is preferably one having an adjustable indicator hand 5, by which the hand may be set or synchronized with various degrees of current consumption. While an ordinary type of ammeter is employed, it is not in the present instance, utilized to measure in units of current consumption, but is preferably made to read in percentages or degrees of overrun. That is to say, in lieu of the usual dial having thereon, units of electrical measurements, there is preferably substituted a second dial graduated in degrees which will indicate the proportion of the mass of ice cream in its relation with the bulk of the original mixture.

Mixtures of different character will vary somewhat in relation one with the other as to the amount of current initially required. That is to say, a mixture which contains more sugar may require more effort or power to initially stir during the freezing operation. Likewise, mixtures are made according to different formulæ, varying in density and specific gravity. The mixture of whatever formulæ having been placed in the freezer, the motor is started, and the adjustable indicator hand 5 of the instrument 4 is adjusted to a zero position. As the freezing operation progresses and the mixture becomes more and more fixed or semifluid, it becomes more resistant and the indicator hand 5 indicative of increased consumption necessary to drive the motor will move across the dial. When the indicator hand discloses a resistance according to the predetermined degree of solidity, the brine is shut off, or the freezing operation otherwise arrested. The agitation of the mixture is then continued, and air is whipped into the partially frozen mixture. As the air is incorporated and the body of ice cream expands, the resistance to the movement of the agitator gradually decreases, requiring less consumption of current and the indicator hand 5 will move in reverse direction across the indicator, where the degree of expansion may be read upon the dial, progressively in increasing percentages of expansion. That is to say, as the amperage falls, and the indicator hand returns toward its starting point, the figures upon the dial will represent increases of percentage of expansion or overrun. Thus the indicator hand of the ammeter now used as a test instrument for the condition of the ice cream batch, gradually moves in one direction, under the influence of increasing current consumption, until the predetermined arresting point of the freezing operation is reached, whereupon it gradually returns in the opposite direction during the progress of the whipping or aerating operation, and by its movement, progressively indicate proportional percentages of overrun or expansion. For convenience there may be provided two scales upon the dial one reading in one direction, to indicate solidity during the freezing operation and the second scale reading in the opposite direction to indicate percentage of overrun. Such scale is readily calibrated by the measuring and weighing method heretofore described. That is to say, the master scale may be made by drawing off from time to time the measured quantity of the batch, and weighing the same to ascertain the amount of expansion or overrun, which percentage of overrun is noted upon the dial at a point coincident with the position of the indicator at such stage of operation. Such master dial having once been made, this calibrating process need not be repeated, but can be copied on succeeding dials for other instruments. The same readings will apply to batches of different character, density or specific gravity, by initially setting the indicator or pointer to a predetermined starting point, so that it will indicate zero at starting regardless of the current consumption required in the initial operation.

While the invention has been described in its application to the manufacture of ice cream, it is to be understood that its range of usefulness is not so limited nor restricted, but it may be applied to various culinary operations, and treatment of materials wherein their condition, character or consistency is modified by agitation, beating or whipping, as in the whipping of cream or eggs, the making of candy, the mixing of batters, compounding of salves or ointments and other like operations.

Having thus described my invention, I claim:

1. The combination with an ice cream freezer and driving means therefor, of a power meter controlled by and varying with the power required to drive the freezer, said meter being provided with two scales common to a single indicator, one of said scales reading directly with variations of power required to indicate the degree of solidity of the ice cream, the other scale reading inversely as the power consumed to indicate increasing degrees of expansion of "overrun" as the power required decreases during the whipping operation.

2. The combination with a motor driven ice cream freezer, of a power meter employed to indicate the degree of expansion or "overrun" of the product by the decrease of power consumed during the whipping operation.

3. A meter for indicating progressively the degree of expansion or "overrun" of ice cream or the like during agitation, comprising a power controlled meter, actuated by decreasing variations of power required for driving the agitator, to indicate thereby increased degrees of expansion of the product.

4. In an apparatus of the character described, the combination with an agitator, a driving member and a meter controlled by and varying with the power required to operate the agitator, said meter by its variation indicating the degree of expansion or overrun of the product.

5. In an apparatus of the character described, the combination with an agitator and driving means therefor, of a power meter controlled by the power consumed in driving the agitator, said meter being provided with an indicating scale arranged to read inversely as the power consumption.

6. The herein described method of determining the degree of expansion or "overrun" in the manufacture of ice cream, consisting in measuring and correspondingly indicating the decrease of power necessary to agitate the ice cream during the progress of the whipping or aeration.

7. The herein described method of gauging the manufacture of ice cream and the like, consisting in agitating the mixture during the freezing operation by a mechanical motor, measuring the increase of power required by the motor until the resistance to the agitator indicates the desired degree of solidity, arresting the freezing operation, continuing the agitation to incorporate air in the mixture and measuring the decrease of power required by the motor to ascertain the degree of expansion of the frozen mixture.

8. The herein described method of gauging the manufacture of ice cream and the like, consisting in utilizing a mechanical motor to beat air into the partially frozen mixture to effect an expansion thereof and measuring and correspondingly indicating the decreasing power consumption of the motor to ascertain inversely the relative expansion of the product.

9. The method of gauging the manufacture of ice cream or the like, consisting in agitating the mixture by an electric motor, measuring the electric current consumed by the motor until the increased power consumption indicates the desired consistency arresting the freezing operation and measuring the electric current consumption of the motor during subsequent agitation to ascertain by the decrease of current consumption, the relative degree of over-run or expansion.

10. The herein described method of gauging a body of ice cream wherein the degree of expansion or overrun varies inversely as the power required to agitate the same consisting in measuring the decrease of power requirement and correspondingly indicating same in units of bulk measurement.

In testimony whereof, I have hereunto set my hand this 10th day of August, A. D. 1921.

LOWELL A. SUTERMEISTER.

Witness:
GEORGE C. HELWIG.